United States Patent [19]

Koopmann

[11] Patent Number: 5,003,819

[45] Date of Patent: Apr. 2, 1991

[54] SUSPENSION SIMULATOR

[75] Inventor: Gary H. Koopmann, State College, Pa.

[73] Assignee: Bridgestone/Firestone, Inc., Akron, Ohio

[21] Appl. No.: 459,854

[22] Filed: Jan. 2, 1990

[51] Int. Cl.$^5$ ............................................. G01M 17/02
[52] U.S. Cl. ............................................. 73/146; 73/8
[58] Field of Search ............................. 73/146, 8, 9

[56] References Cited

U.S. PATENT DOCUMENTS

| | | | |
|---|---|---|---|
| 2,700,297 | 1/1955 | Allen | 73/9 |
| 2,869,362 | 1/1959 | Gough et al. | 73/146 |
| 2,920,481 | 1/1960 | Hulswit, Jr. et al. | 73/146 |
| 3,060,733 | 10/1962 | Herzegh | 73/146 |
| 3,119,257 | 1/1964 | Spear | 73/146 |
| 3,332,276 | 7/1967 | Clarke | 73/9 |
| 3,375,714 | 4/1968 | Bottasso | 73/146 |
| 3,948,095 | 4/1976 | Burgett et al. | 73/146 |
| 4,359,896 | 11/1982 | Brown, Jr. et al. | 73/146 |
| 4,458,526 | 7/1984 | Doi et al. | 73/146 |
| 4,499,759 | 2/1985 | Hull | 73/146 |
| 4,691,564 | 9/1987 | Potts et al. | 73/146 |

Primary Examiner—Donald O. Woodiel
Attorney, Agent, or Firm—Ernst H. Ruf

[57] ABSTRACT

A dynamic load simulator is provided to simulate the suspension system of a vehicle. A spindle, connected to a suspension system, receives a tire in engagement with a rotating drum. A force gauge and velocity gauge are maintained at the spindle to monitor axle forces and movement. Road force is monitored by gauges maintained within the rotating drum. Adjustable springs, dampers, resonators, and weights allow the characteristics of the suspension system to be tailored to simulate those of an actual or conceptual.

19 Claims, 2 Drawing Sheets

SUSPENSION SIMULATOR

TECHNICAL FIELD

The invention herein resides in the art of simulators and, more particularly, to an apparatus for synthesizing or replicating the suspension system of a vehicle or the mobility of a vehicle's suspension system.

BACKGROUND ART

Tire noise and vibration are of great significance to tire designers and manufacturers. Subjective judgments of the road worthiness of a tire are usually based on the driver's "feel" of the tire response. Tire noise often reaches the driver's ears as a component of the interior noise of the car while tire vibration is transmitted through various mechanical linkages such as the steering column. To minimize such noise and vibration, it is necessary to understand the role the dynamics of the tire have in transmitting the forces generated by uneven road surfaces and tire anomalies to the suspension system of the vehicle, particularly at high speeds. Since the mechanical properties of the tire are altered considerably by the type of load and suspension system supported, the dynamics of the tire cannot be determined in isolation, but measurements of the dynamic response of the tire must be made while the tire is supporting a representative dynamic load.

It is most desirable that a system be provided for assessing the dynamic response of a tire to various road surfaces under realistic loading conditions. To achieve this condition, a suspension simulator, replicating such a realistic dynamic load, would necessarily simulate the dynamics of a load bearing suspension system of a selected vehicle within a laboratory setting. Accordingly, the selection of tires for a new vehicle could be conducted in a laboratory to identify those tires best suited to produce the smoothest and quietest conditions for occupants of the vehicle.

It is further desired that an analytical method be developed to study the dynamic response of the tire subjected to a systematic variation of road surfaces and dynamic loading conditions. Data obtained from the implementation of a suspension simulator can be used for such a purpose. Using such data, determinations can be made as to the extent that tire dynamics are influenced by the dynamics of a vehicle suspension system. In addition to providing support data for the tire selection process as mentioned above, such a study may also provide viable information to those attempting to model the dynamic response of a tire through the finite element method or other similar methods.

In general, it is most desirable that a suspension simulator be provided to allow tire designers to investigate modal coupling between an automobile suspension and the associated tire. Such modal coupling is the dynamic interaction between these two systems each of which can resonate at various frequencies. By configuring the suspension simulator such that its dynamic characteristics may be varied to replicate the dynamic characteristics of a given automobile suspension system, a designer may develop a tire for the given automobile without having to bring the automobile to the test facility itself. Indeed, the dynamic characteristics of the vehicle suspension system may be obtained from the vehicle manufacturer.

It has been determined that the assessment of the dynamics of a rolling tire within a laboratory environment requires the determination of a number of criteria. The magnitude and phase of the unsteady forces transmitted from the road surface of the rolling drum, endless belt, or similar device to the tire must be measured. The magnitude and phase of the unsteady forces and velocity transmitted to the wheel axle must be measured. The magnitude and phase of the reaction forces generated by the dynamic load on the wheel axle must be representative of an actual or conceptual suspension system. Finally, gradual changes in the components of the dynamic load must be implemented during rolling conditions to assess the effect of such changes on tire dynamics, for small changes in the resonance of a suspension system can cause large changes in the tire dynamics.

DISCLOSURE OF INVENTION

In light of the foregoing, it is a first aspect of the invention to provide a suspension simulator which simulates the load bearing suspension system of a vehicle.

Another aspect of the invention is the provision of a suspension simulator which is adjustable and variable to simulate characteristics of various vehicles.

Still a further aspect of the invention is the provision of a suspension simulator which is adapted to measure forces transmitted from the road to a vehicle tire.

An additional aspect of the invention is the provision of a suspension simulator which measures the magnitude and phase of forces and velocities transmitted to the wheel and axle of the vehicle.

Yet another aspect of the invention is to provide a suspension simulator in which the magnitude and phase of reaction forces generated by a dynamic load on a wheel axle are representative of those experienced in an actual or conceptual suspension system.

Still a further aspect of the invention is the provision of a suspension simulator in which gradual changes in components of the dynamic load may be implemented during the testing operation to assess the impact of such changes on tire dynamics.

Another aspect of the invention is the provision of a suspension simulator which is adapted to analyze tire uniformity, concentricity, construction features, and operation conditions.

A further aspect of the invention is the provision of a suspension simulator for testing and characterizing suspension systems components.

The foregoing and other aspects of the invention which will be come apparent as the detailed description proceeds are achieved by a suspension simulator for testing a wheel and tire assembly, comprising: a spindle receiving a wheel and tire assembly; a movable surface in contacting engagement with said tire for simulating a road surface; suspension means connected to said spindle for replicating a suspension system of a vehicle; and load means connected to said suspension means for imparting a load upon said tire against said movable surface.

Other aspects of the invention which will become apparent herein are attained by a suspension simulator for testing a tire and wheel assembly, comprising: a spindle adapted for receiving a tire and wheel assembly; a movable surface maintained beneath said spindle for engaging and rotating the tire; a suspension system connected to said spindle; a mass movable about a pivot point and connected to said suspension system, positioning of said mass with respect to said pivot point effecting a desired load on the tire received on said spindle; a first force gauge connected to said spindle for monitoring forces imparted thereto; a second force gauge connected to said movable surface for measuring forces imparted to said movable surfaces by the tire; and a transducer connected to said spindle for measuring the velocity of movement of said spindle.

BRIEF DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
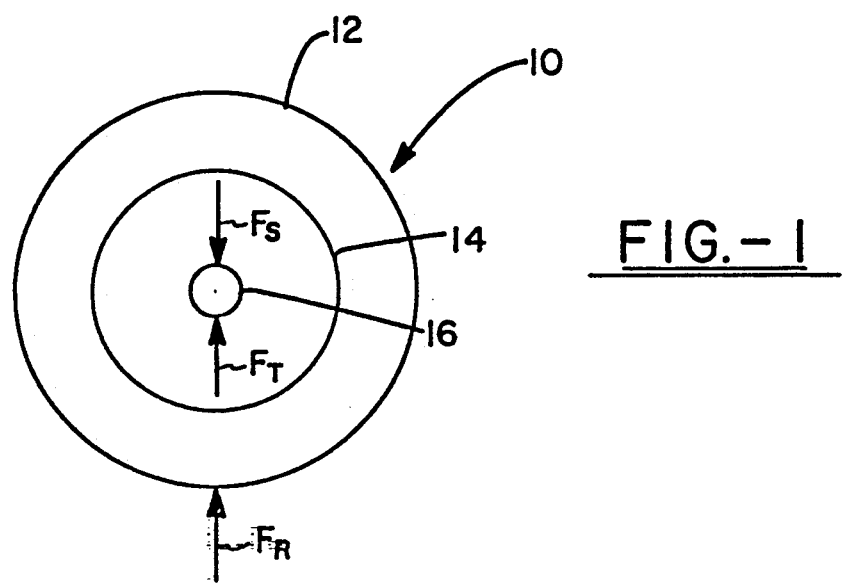
FIG. 1 is a side view of a tire and axle assembly showing the forces thereon.

Referring now to the drawings and more particularly FIG. 1, it can be seen that a vehicle tire and wheel assembly is designated generally by the numeral 10. A tire 12 is mounted on a wheel 14 which in turn is received by and rotatable upon an axle 16. At the axle 16 the forces of the vehicle's suspension system and the forces imparted to the tire from the road surface are summed. It is fundamental that $F_A = F_S - F_T$, where $F_a$ is the time dependent force on the axle, $F_S$ is the force of the suspension system imparted to the axle and $F_T$ is the tire force exerted on the axle. It is further well known that $T = F_T/F_R$, where T is the transmissibility of the tire, and $F_R$ is the road force exerted on the tire. Accordingly, $F_T = TF_R$.

It is further known that $Y_S = V_S/F_S$, where $Y_S$ is the mobility of the vehicle suspension system, $V_S$ is the vertical velocity of the suspension system, and $F_S$ is the force on the axle from the suspension system as presented above. Accordingly $F_S = V_S/Y_S$.

It should now be apparent that $F_A = V_S/Y_S - TF_R$. Since $Y_S$, the mobility of the suspension system of the vehicle, can be supplied by the vehicle manufacturer, and since $F_A$, $V_S$, and $F_R$ are all values which can be measured, the equation last mentioned can be solved for the transmissibility T of the tire. Since the transmissibility of the tire indicates the amount of force transmitted by the tire to the suspension system as noise and vibration, it is desirable to either minimize the transmissibility T or to tailor that value with the mobility of the suspension system $Y_S$ to minimize noise and vibration transmitted to the vehicle.

Figure 2:
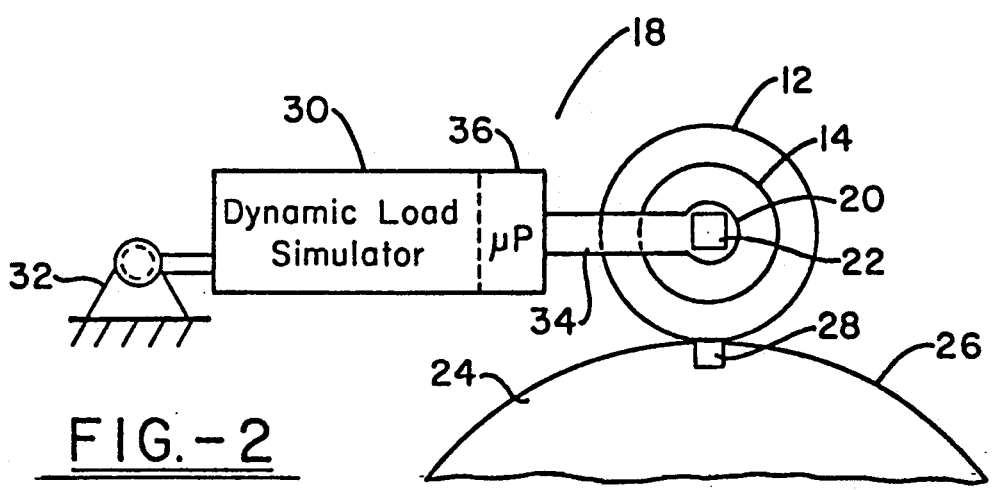
FIG. 2 is an illustrative side elevational view of a suspension simulator system according to the invention.

To obtain the data identified above, a wheel and suspension simulation system 18, such as shown in FIG. 2, may be employed. Here, an axle or spindle 20 receives the tire and wheel assembly 10 for rotational movement thereabout. Maintained at the spindle 20 is a force gauge 22 adapted for measuring the force $F_A$ on the axle. The wheel and tire assembly 10 is in engagement with a drum 24 driven by an appropriate motor or the like. The outer surface 26 of the drum 24 replicates a road surface, simulating concrete, asphalt, or the like. At the surface of the drum 24 is an appropriate force gauge or the like 28, for sensing the road force $F_R$ imparted to the tire 12. The details of the force gauge will be presented later. Further, while only one such force gauge 28 is shown, it will be understood that a plurality of such force gauges may be equally spaced about the circumference of the drum 24.

A dynamic load simulator 30, provided to replicate the suspension system of a vehicle, is pivotally interconnected to the bearing 32 at one end thereof and to the spindle 20 through the arm 34 at the opposite end. A microprocessor or other suitable control unit 36 is provided as part and parcel of the dynamic load simulator 30 to regulate the characteristics of the dynamic load simulator and to receive data from the various sensors associated with the system 18. Utilizing such data, the tire transmissibility T can be determined.

Figures 3, 6:
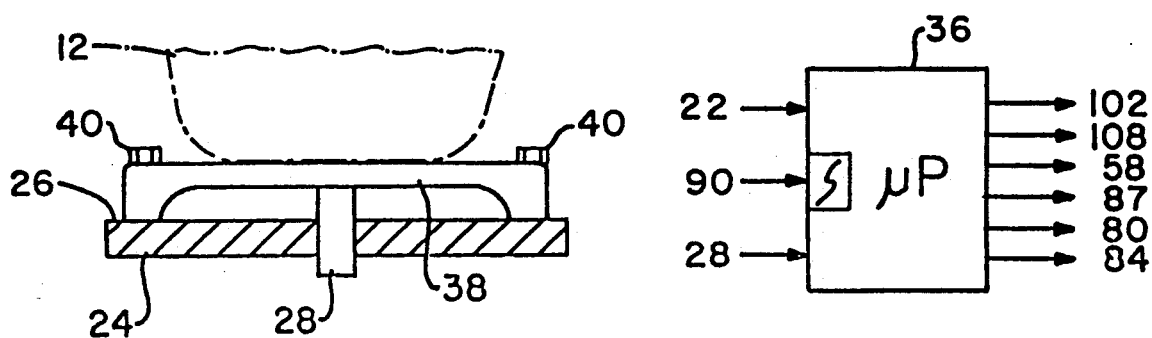
FIG. 3 is a cross sectional view showing the implementation of a force gauge in the road wheel or drum to measure road force.
FIG. 6 is a block diagram of the microprocessor control unit of the invention showing the inputs and outputs thereof.

As shown in FIG. 3, the displacement gauge 28 for measuring the road force $F_R$ is positioned in proximity or engagement with a plate 38 spanning the width of the drum 24 and encompassing a circumferential sector which will provide a representative measure of the road-tire interaction force. The plate 38 is secured to the frame of the drum 24 by appropriate bolts 40 or other suitable fastening means. The frame of the drum 24 receives and maintains the displacement gauge 28 in a fixed position, with the sensing end thereof in proximity or in contacting engagement with the plate 38. The displacement gauge 28 may comprise a proximeter, a linear variable differential transformer (LDVT), or other suitable device or force transducer capable of measuring and monitoring deflection of the plate 38. It will be appreciated that as the tire 12 rolls over the plate 38, the loading on the tire causes the plate 38 to dynamically deflect slightly, the degree of dynamic deflection being sensed and measured by the gauge 28 which, in turn, correlates such deflection to a force, such being the road force $F_R$ imparted to the tire. Accordingly, the drum 24 is provided with a road surface of predefined characteristics which is interrupted at equally spaced circumferential distances by a proximeter or other appropriate force gauge, from which road force signals can be determined.

Figure 4:
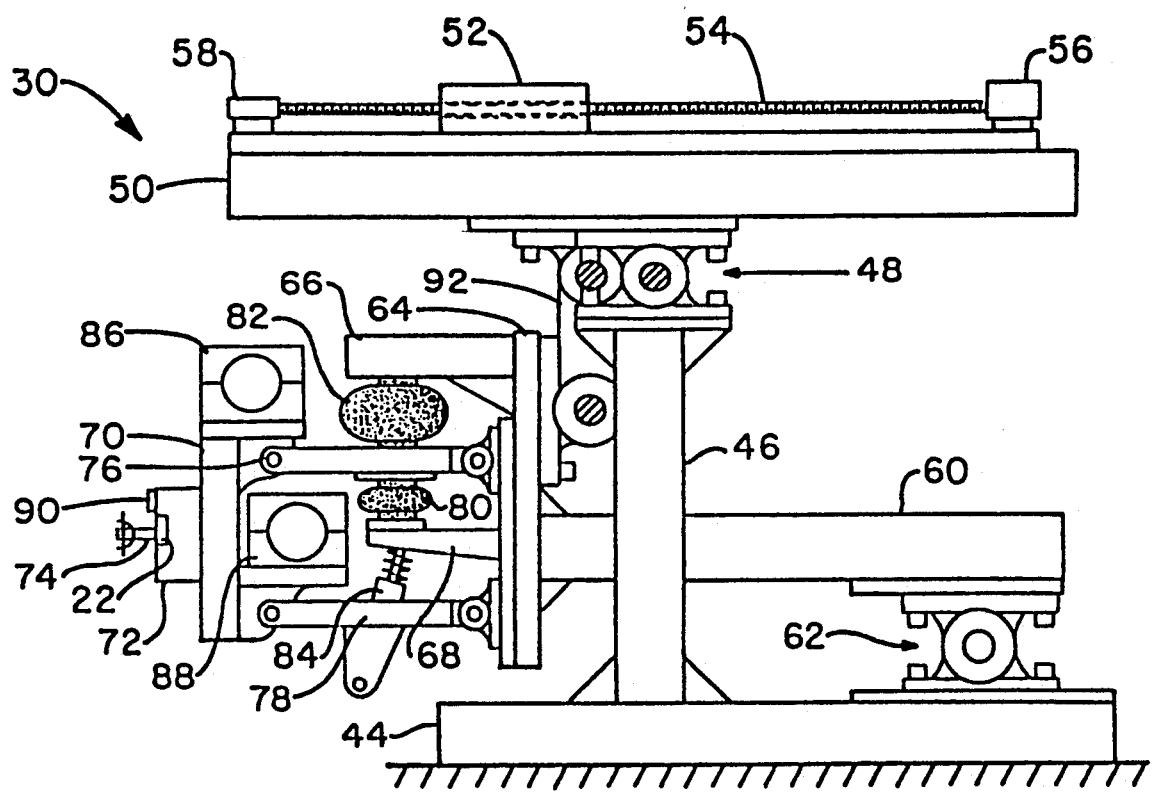
FIG. 4 is a side elevational view of the dynamic load simulator of the invention.

The second portion of the system, the dynamic load simulator 30, is shown in detail in FIG. 4. Here it is seen that a substantial base portion 44 has extending therefrom a pair of vertical posts 46. A pivot bearing assembly 48 bridges and interconnects the vertical posts 46 and is adapted for pivotally receiving the load control arm 50. A movable mass 52 is longitudinally movable along the control arm 50 by interconnection with a worm screw 54 maintained at one end thereof by a bushing or bearing 56, and by a motor or other suitable drive means 58 at the other. It will be appreciated that the motor 58 may be controlled and driven by the microprocessor 36 to automatically position or regulate the position of the mass 52 with respect to the control arm 50. Of course, the motor 58 could be replaced with a manual crank for such positioning. It will be appreciated that while a single mass 52 is shown, two or more of such masses could be employed to provide greater flexibility in replicating a suspension system, such masses being the same or dissimilar, as desired.

As further shown in FIG. 4, a transverse arm 60 is interconnected to the base 44 by means of a pivot bearing assembly 62. As shown, the arm 60 is substantially parallel to the base 44 and is connected at an opposite end to the cross head back plate 64, which receives and supports structure simulating that of the vehicle's suspension as presented directly below. Upper and lower head members 66, 68, extend normally from the back plate 64, providing further support surfaces for interconnection with the various suspension members.

A spindle plate 70 receives and maintains the spindle housing 72, from which extends a spindle 74 adapted for receiving the wheel and tire assembly 10. An upper A-frame member 76 and a lower A-frame member 78 are provided to pivotally interconnect the spindle plate 70 with the cross head back plate 64. Comprising a further portion of the suspension are lower and upper air springs 80, 82, operation on the upper A-frame member 76 and interposed between the upper and lower head members 66, 68. It will be appreciated by those skilled in the art that the air pressure of the air springs 80, 82 can be varied to change the amplitude and frequency of the force at the spindle 74.

There is further provided a damper or shock absorber 84 or additional mechanical springs, interposed between the lower A-frame member 78 and the lower head member 68. The characteristics of the damper 84 may be modified or varied for different rates of damping about the resonance frequency of the suspension system. It will, of course, be understood and appreciated by those skilled in the art that regulation of the air springs 80, 82 and the damper 84 may be automatically controlled by means of the microprocessor 36.

As further shown in FIG. 4, an upper resonator mount 86 is provided at the top of the spindle plate 70, while a lower resonator mount 88 is provided behind and substantially axially aligned with the spindle 74 and spindle plate 70. The details of the resonator to be received by the mounts 86, 88 will be presented below with respect to FIG. 5.

It will be appreciated that an appropriate force gauge 22 is provided in association with the spindle housing 72 to measure the force $F_A$ on the axle or spindle 74. Also provided in association with the spindle housing 72 is an accelerometer 90, presenting an output signal corresponding to accelerational or decelerational forces on the spindle 74. As will be appreciated by those skilled in the art, the output signal from the accelerometer 90 may be provided to the microprocessor 36 and, through an appropriate integrator, the instantaneous velocity of vertical movement of the spindle 74 can be determined, corresponding to the value $V_S$, discussed above.

It should now be noted that a transfer load link 92, comprising a plate pivotally connected at one end to the load control arm 50 and at the other end to the cross head back plate 64 provides for the application of the sprung load to the tire assembly 10 mounted on the spindle 74. By the positioning of the mass 52, the resulting lever imparts the desired load through the link 92 to the simulated vehicle suspension system.

it should now be appreciated that the fundamental resonance frequency of the suspension system can be set by the load control arm 50 and the movable mass 52 and adjustment of the air springs 80, 82 and spring damper arrangement 84. Appropriate positioning of the mass 52, to simulate the sprung load of a vehicle suspension, can obtain the desired resonant frequency. In like manner, secondary and tertiary resonance frequencies can be set by the resonators maintained at the resonator mounts 86, 88 to be discussed directly below.

Figure 5:
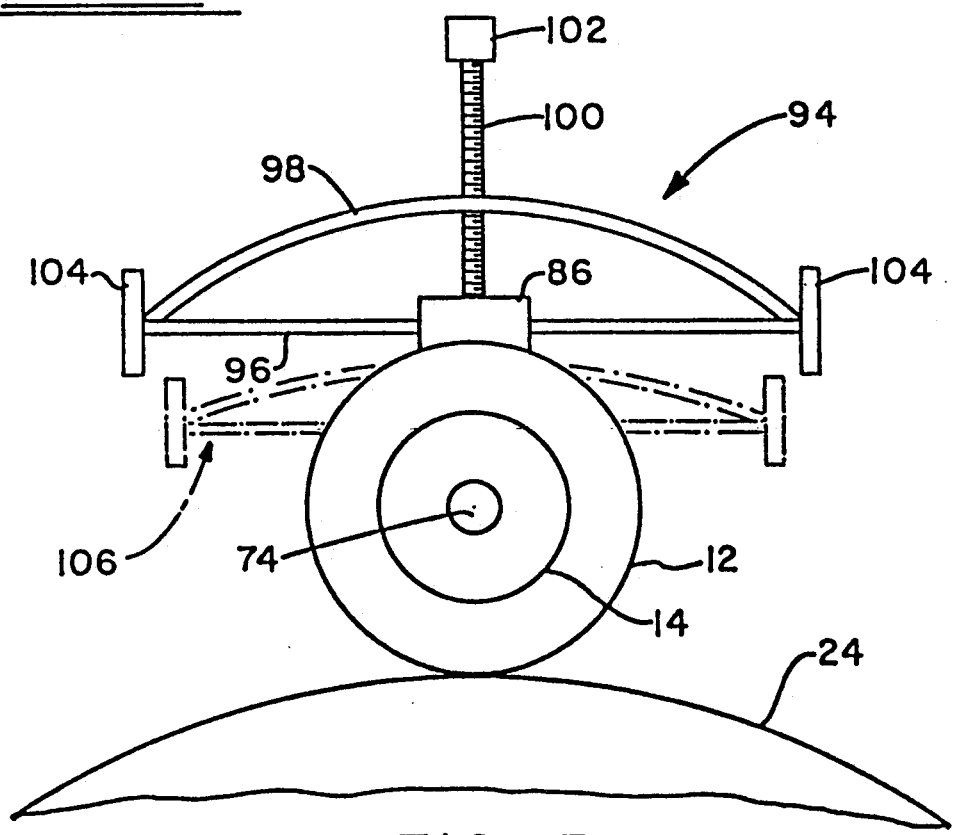
FIG. 5 is an illustrative front elevational view of the system of FIG. 4, showing the implementation of the resonators.

FIG. 5 presents an illustrative frontal view of the suspension simulator of the invention, illustrating the structure and features of the resonators to be received by the resonator mounts 86, 88. As shown, a secondary resonator 94 comprises a lower spring steel leaf 96 secured by the mount 86, and an upper spring steel leaf 98 threaded on the worm gear 100. The worm gear is driven by an appropriate motor 102, under control of the microprocessor 36. Of course, the motor 102 could be replaced by a hand crank for manual adjustment. A pair of weights 104 are presented at opposite ends of the resonator 94 at points of interconnection between the lower leaf 96 and upper leaf 98. The weights 104 provide reaction forces which act on the spindle 74 to provide a dynamic magnification factor. It will be appreciated by those skilled in the art that as the spacing between the leaves 96, 98 is increased by rotation of the worm screw 100, the characteristic frequency of the resonator 94 increases. Of course, this frequency is also controlled by selection of the mass of the end weights. Similarly, as the spacing is decreased, the frequency decreases. If desired, the leaf springs 96, 98 may be connected to the weights 104 through a resilient or energy absorbing material.

It should also be appreciated that a tertiary resonator 106, shown in phantom, is received by the mount 88. The resonator 106 is substantially identical in structure to the resonator 94, having upper and lower spring steel leaves with weights at opposite ends thereof, and being selectively adjustable by means of a motor drive under control of the microprocessor 36.

With reference to FIG. 6, the inputs and outputs to the microprocessor or control unit 36 can be appreciated. As shown, an appropriate force gauge 22 maintained at the spindle 74 presents an output signal $F_A$ corresponding to the associated axle force. The output of the proximeter or force gauge 28 from the drum 24 is also passed to microprocessor 36 representing the road force $F_R$. Finally, there is also presented an acceleration signal from the accelerometer 90 representing the acceleration of vertical movement at the spindle 74. This acceleration signal is passed to an integrator in the microprocessor 36, from which the velocity signal $V_S$ is derived. Additionally, it will be understood that $Y_S$, representative of the suspension mobility, is a known time dependent function obtained from the vehicle manufacturer. Accordingly, the microprocessor can, with the data provided, solve for T, the transmissibility of the tire.

As shown, the microprocessor provides output control signals to the motor 58 for controlling the positioning of the mass 52. It also controls pressurization of the lower and upper air springs 80, 82 to vary or change the amplitude and frequency of the forces at the spindle 74. Additionally, the microprocessor 36 can modify the damper or shock absorber 84 to obtain different rates of damping about a resonance frequency. Finally, the microprocessor 36 can control the motors 102, 108 of the associated secondary and tertiary resonators 94, 106 to obtain desired secondary and tertiary resonance frequencies for the simulated suspension system. Further, the microprocessor 36 can control the speed of rotation of the drum 24 and, accordingly, the effective rotational speed of the tire 12.

It should now be appreciated that the suspension simulator of the invention can be controlled to exhibit various characteristic resonance frequencies corresponding to the suspensions of various vehicles. Further, various modifications and adjustments of the characteristics of the suspension system can be made during a testing operation, and various data can be obtained under such modified conditions. Accordingly, utilizing the structure and concept of the invention, a family of curves for any given tire can be developed demonstrating the transmissibility and suitability of such a tire for implementation on a vehicle having particular suspension characteristics. Accordingly, the simulator is universal, capable of simulating and replicating the dynamic characteristics of a broad range of vehicle suspensions, and adaptive to adjustment, modifications, and changes during use.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the following claims.

What is claimed is:

1. A suspension simulator for testing a wheel and tire assembly, comprising:
   a spindle receiving a wheel and tire assembly;
   a movable surface in contacting engagement with said tire for simulating a road surface;
   a suspension means connected to said spindle for replicating a suspension system of a vehicle;
   load means connected to said suspension means for imparting a load upon said tire against said movable surface;
   a force gauge connected to said spindle for monitoring forces imparted to said spindle;
   means connected to said spindle for measuring the movement thereof; and
   means in juxtaposition to said movable surface for measuring a force imparted from said movable surface to said tire.

2. The suspension simulator according to claim 1, wherein said means for measuring force imparted to said tire from said movable surface comprises a displacement gauge.

3. A suspension simulator for testing a wheel and tire assembly, comprising:
   a spindle receiving a wheel and tire assembly;
   a movable surface in contacting engagement with said tire for simulating a road surface;
   suspension means connected to said spindle for replicating a suspension system of a vehicle, said suspension means comprising a pair of frame members pivotally interconnected between a pair of plates, a first one of said plates receiving said spindle; and
   a load means connected to said suspension means for imparting a load upon said tire against said movable surface.

4. The suspension simulator according to claim 3, wherein said suspension means further comprises spring means interposed between said frame members and said plates.

5. The suspension simulator according to claim 4, wherein said spring means comprises adjustable air springs.

6. The suspension simulator according to claim 5, wherein said spring means further comprises an adjustable damper.

7. The suspension simulator according to claim 3, wherein said suspension means further comprises a first resonator extending in a plane normal to an axis of said spindle.

8. The suspension simulator according to claim 7, wherein said first resonator comprises a pair of weights mounted at opposite ends of a spring assembly.

9. The suspension simulator according to claim 8, wherein said spring assembly comprises a pair of leaf springs, fixed together at respective ends, and in regulatable separation from each other therebetween.

10. The suspension simulator according to claim 7, wherein said suspension means further comprises a second resonator parallel to said first resonator.

11. The suspension simulator according to claim 3, wherein said load means comprises a movable mass pivotally maintained by a support at a pivot point and operatively connected to said frame members, positioning of said load means with respect to said pivot point establishing a load on said tire.

12. A suspension simulator for testing a tire and wheel assembly, comprising:
    a spindle adapted for receiving a tire and wheel assembly;
    a movable surface maintained beneath said spindle for engaging and rotating the tire;
    a suspension system connected to said spindle;
    a mass movable about a pivot point and connected to said suspension system, positioning of said mass with respect to said pivot point effecting a desired load on the tire received on said spindle;
    a first force gauge connected to said spindle for monitoring forces imparted thereto;
    a second force gauge connected to said movable surface for measuring force imparted to said movable surface by the tire; and
    a transducer connected to said spindle for measuring the velocity of movement of said spindle.

13. The suspension simulator as recited in claim 12, wherein said suspension system comprises a first adjustable spring interconnected with a first pivotal frame member.

14. The suspension simulator as recited in claim 13, wherein said suspension system further comprises a variable damper interconnected to a second pivotal frame member, said pivotal frame members being operatively connected to said spindle.

15. The suspension simulator as recited in claim 13, wherein said suspension system further comprises a first resonator operatively connected to said first pivotal frame member.

16. The suspension simulator as recited in claim 15, wherein said first resonator comprises a pair of first weights at opposite ends of a centrally supported member.

17. The suspension simulator as recited in claim 16, wherein said first resonator further comprises a second member connected to said pair of first weights at opposite ends thereof, and adjustment means interposed between said first and second members for adjusting and setting a first characteristic resonance frequency thereof.

18. The suspension simulator as recited in claim 17, wherein said first and second member comprise first and second leaf springs, and said means for adjusting and setting said first characteristic resonance frequency adjusts and sets a spacing between said first and second leaf springs.

19. The suspension load simulator as recited in claim 18, further comprising a second resonator operatively connected to said spindle, said second resonator comprising third and fourth leaf springs connected at respective ends thereof to a pair of second weights, a spacing between said third and fourth leaf springs being adjustable to establish a second characteristic resonance frequency.

* * * * *